(12) United States Patent
Gonze et al.

(10) Patent No.: US 7,655,065 B2
(45) Date of Patent: Feb. 2, 2010

(54) HYDROCARBON-ENHANCED PARTICULATE FILTER REGENERATION VIA MICROWAVE IGNITION

(75) Inventors: Eugene V. Gonze, Pinckney, MI (US); David B. Brown, Brighton, MI (US)

(73) Assignee: GM Global Technology Operations, Inc., Detroit, MI (US)

( * ) Notice: Subject to any disclaimer, the term of this patent is extended or adjusted under 35 U.S.C. 154(b) by 588 days.

(21) Appl. No.: 11/497,808

(22) Filed: Aug. 2, 2006

(65) Prior Publication Data

US 2007/0028765 A1 Feb. 8, 2007

Related U.S. Application Data

(60) Provisional application No. 60/705,712, filed on Aug. 3, 2005.

(51) Int. Cl.
*B01D 46/00* (2006.01)
*F01N 3/023* (2006.01)
*F01N 3/025* (2006.01)
*F01N 3/028* (2006.01)

(52) U.S. Cl. .................... 55/523; 55/282.3; 55/283; 55/385.3; 55/524; 55/DIG. 10; 55/DIG. 30; 95/8; 95/14; 95/15; 95/19; 95/20; 95/23; 95/278; 96/417; 96/420; 96/421; 96/422; 60/285; 60/286; 60/295; 60/297; 60/311; 701/102

(58) Field of Classification Search .............. 55/282.2, 55/282.3, 283, 385.3, 523, 524, DIG. 10, 55/DIG. 30; 95/14, 15, 19, 20, 23, 273, 278, 95/8; 60/274, 285, 286, 295, 297, 311; 701/102, 701/114; 96/417, 420, 421, 422
See application file for complete search history.

(56) References Cited

U.S. PATENT DOCUMENTS

| 4,505,726 | A |   | 3/1985 | Takeuchi |
| 4,516,993 | A | * | 5/1985 | Takeuchi et al. ............. 55/283 |
| 4,685,290 | A | * | 8/1987 | Kamiya et al. ............... 60/274 |
| 6,379,407 | B1 | * | 4/2002 | Blackwell et al. .......... 55/282.3 |
| 6,942,708 | B2 | * | 9/2005 | Peter et al. ................. 55/282.3 |
| 7,031,827 | B2 | * | 4/2006 | Trudell et al. ............... 701/114 |
| 7,210,286 | B2 | * | 5/2007 | Sun et al. ....................... 60/311 |
| 7,448,201 | B2 | * | 11/2008 | Kaiser ........................... 60/295 |
| 7,484,503 | B2 | * | 2/2009 | Wyatt et al. .................. 60/295 |
| 2004/0128985 | A1 | * | 7/2004 | Shimasaki et al. ............ 60/286 |
| 2004/0144069 | A1 | * | 7/2004 | Gabe et al. ................. 55/282.3 |
| 2008/0307773 | A1 | * | 12/2008 | Kogo ............................ 60/286 |

* cited by examiner

*Primary Examiner*—Jason M Greene

(57) ABSTRACT

A regeneration method for a particulate filter includes estimating a quantity of particulate matter trapped within the particulate filter, comparing the quantity of particulate matter to a predetermined quantity, heating at least a portion of the particulate filter to a combustion temperature of the particulate matter, and introducing hydrocarbon fuel to the particulate filter. The hydrocarbon fuel facilitates combustion of the particulate matter to regenerate the particulate filter.

18 Claims, 3 Drawing Sheets

A-A

HYDROCARBON-ENHANCED PARTICULATE FILTER REGENERATION VIA MICROWAVE IGNITION

CROSS-REFERENCE TO RELATED APPLICATIONS

This application claims the benefit of U.S. Provisional Application No. 60/705,712, filed on Aug. 3, 2005. The disclosure of the above application is incorporated herein by reference.

STATEMENT OF GOVERNMENT RIGHTS

This invention was produced pursuant to U.S. Government Contract No. DE-FC-04-03 AL67635 with the Department of Energy (DoE). The U.S. Government has certain rights in this invention.

FIELD OF THE INVENTION

The present invention relates to means for regenerating a heated particulate filter, and more particularly to such means which include a second energy source in combination with an electrical energy source.

BACKGROUND OF THE INVENTION

Exhaust gas from internal combustion engines, such as gasoline direct injection, homogeneous charge-compression ignition (HCCI), lean burn gasoline direct injection, alcohol fueled, and the like, includes particulate matter or soot that can contribute to environmental pollution. As such, an exhaust system of the engine may be fitted with a particulate filter that traps the particulate matter. After the engine has run for some time, the particulate filter needs to be cleared of the particulate matter through a regeneration process.

In one regeneration process, the particulate filter can be fitted with a microwave source that heats microwave absorbent spots located on a filter element within the particulate filter. The microwave absorbent spots heat to temperatures between about 500-900 deg. C. and ignite the particulate matter to burn it away. An undesirable aspect of this microwave heating method is that a microwave generator and antenna are only about 50% efficient in converting electrical energy to radiated microwave energy. As such, existing microwave heating methods require an undesirable amount of electrical energy in order to be effective.

Referring now FIGS. 1-2, simulation results are shown for a regeneration cycle of such a microwave heated particulate filter. The simulation assumes a filter substrate of the particulate filter is 7 ½ inches in diameter, 8 inches long, and has a channel density of 100 channels per square inch. The simulation assumes a radiated microwave power is 1000 watts (1 KW).

Referring now to FIG. 1, a graph 10 is shown having an x-axis 12 scaled in meters and a y-axis 14 scaled in degrees Kelvin (deg K). The x-axis 12 represents distance into inlet channels of the substrate. The y-axis 14 represents temperature of the accumulated particulate matter in the inlet channels.

A first line 16 indicates the temperatures of particulate matter in the inlet channels after the radiated microwave power has been turned on for eleven seconds. Peaks at locations 18 indicate locations of the microwave absorbent spots. A second line 20 indicates the temperatures of particulate matter in the inlet channels after the radiated microwave power has been turned on for sixty-one seconds. The radiated microwave power was turned off after the sixty-one seconds. The second line 20 shows that the temperatures of the particulate matter accumulated in the inlet channels are higher than in the first line 16.

A third line 22 indicates the temperatures of the inlet channels fifty-nine seconds after the radiated microwave energy was turned off. It can be seen from the third line 22 that the temperatures of a substantial portion of the particulate matter are below the oxidation temperature of the particulate matter, which is between about 773 and 873 deg. K. (500 and 600 deg. C.). The third line 22 therefore indicates that the oxidation reaction in the accumulated particulate matter extinguished before substantially all of the particulate matter oxidized.

Referring now to FIG. 2, a graph 30 is shown that correlates with the graph 10 if FIG. 1. The graph 30 includes an x-axis 32 and a y-axis 34 scaled in meters (m). The x-axis 32 represents distance into the inlet channels. The y-axis 34 represents thickness of the accumulated particulate matter in the inlet channels.

A first line 36 indicates thicknesses of particulate matter on walls of the inlet channels after the radiated microwave power has been turned on for the eleven seconds. Valleys at positions 18 indicate the locations of the microwave absorbent spots. A second line 40 indicates thicknesses of particulate matter on the walls of the inlet channels after the radiated microwave power has been turned on for the sixty-one seconds. The radiated microwave energy was turned off after the sixty-one seconds.

A third line 42 indicates thicknesses of particulate matter on the walls of the inlet channels fifty-nine seconds after the radiated microwave energy was turned off. The third line 42 shows that the thicknesses of particulate matter between about 0.01 m and 0.05 m (see inside dashed circle 44) into the inlet channels changed little from the first line 36. Since the particulate matter did not combust in that region it is apparent that that region of the inlet channels did not regenerate.

From FIGS. 1 and 2 it can be seen that the heated particulate filter is unable to completely regenerate without undesirably providing it with additional electrical energy. The additional electrical energy could be used to heat more and/or larger microwave absorbent spots and/or continue the radiated microwave power for longer than the sixty-one seconds. Any of these options could undesirably discharge a charging system and/or battery associated with the engine.

SUMMARY

A regeneration method for a particulate filter includes estimating a quantity of particulate matter trapped within the particulate filter, comparing the quantity of particulate matter to a predetermined quantity, heating at least a portion of the particulate filter to a combustion temperature of the particulate matter, and introducing hydrocarbon fuel to the particulate filter. The hydrocarbon fuel facilitates combustion of the particulate matter to regenerate the particulate filter.

A particulate filter regeneration system includes a control module. A sensor communicates with the control module and generates a signal indicative of a quantity of particulate matter within the particulate filter. A heat source is controlled by the control module and heats at least a portion of the particulate filter to a combustion temperature of the particulate matter. A fuel injector is controlled by the control module and delivers hydrocarbon fuel to the particulate filter. The control module estimates the quantity of particulate matter based on the sensor signal, compares the quantity of particulate matter to a predetermined quantity, and delivers hydrocarbon fuel via the fuel injector to facilitate combustion of the particulate matter and regeneration of the particulate filter.

A regenerative particulate filter system includes a control module and a engine including an exhaust manifold and at least one fuel injector that is controlled by the control module. The system also includes a particulate filter including first channels in communication with the exhaust manifold, second channels in communication with an exhaust gas outlet of the particulate filter, and a filter substrate positioned between the first and second inlet channels and collecting at least a portion of particulate matter particulate matter carried by exhaust gas from the engine. Microwave absorbent spots are positioned on the filter substrate. A microwave source that is controlled by the control system heats the microwave absorbent spots to at least a combustion temperature of the particulate matter. The control module estimates a quantity of particulate matter collected on the filter substrate based on an amount of fuel delivered by the at least one injector and consumed by the engine. The control module compares the estimated quantity of particulate matter to a predetermined quantity. The control module turns on the microwave source based on the comparison. The control module controls the at least one fuel injector to dispense a predetermined quantity of hydrocarbon fuel based on the estimated quantity of particulate matter.

BRIEF DESCRIPTION OF THE DRAWINGS

The present invention will become more fully understood from the detailed description and the accompanying drawings, wherein.

DETAILED DESCRIPTION OF THE PREFERRED EMBODIMENTS

Figure 1:
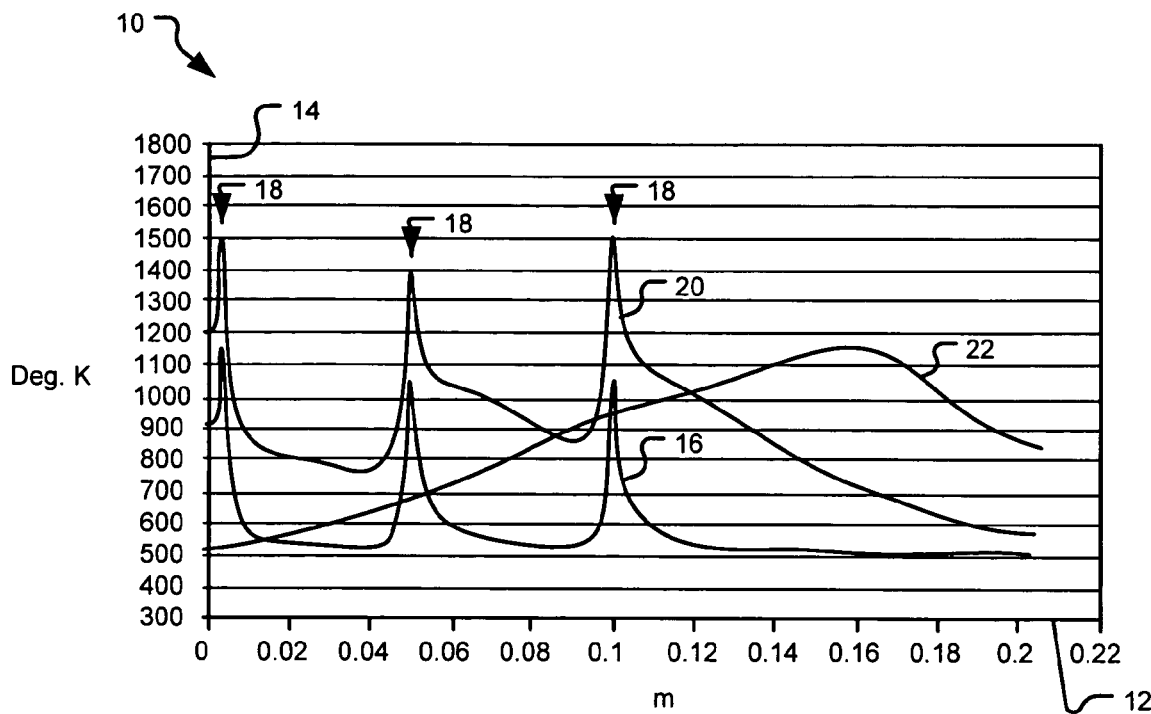
FIG. 1 is a graph depicting simulation results of a particulate filter regeneration cycle of the prior art.
Figure 2:
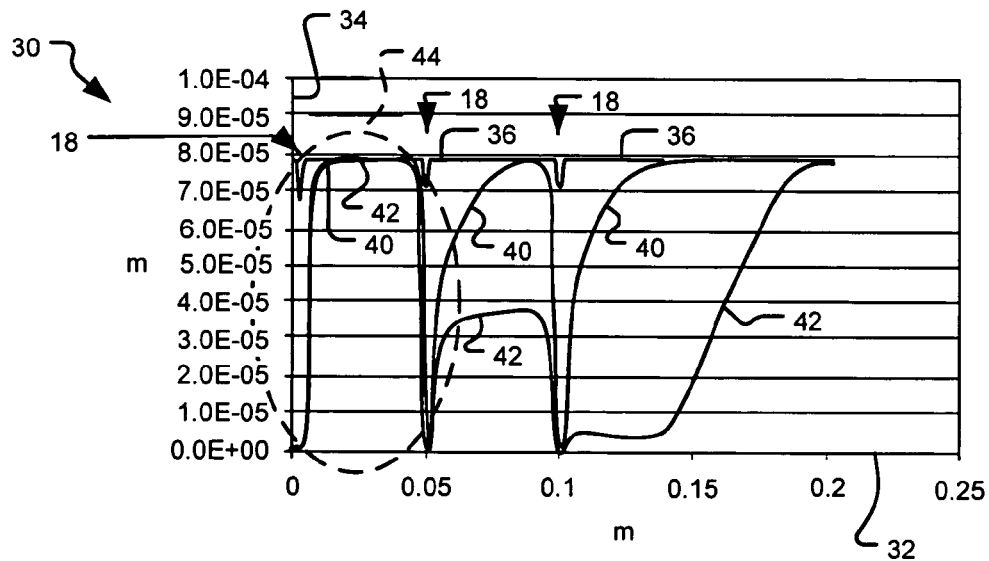
FIG. 2 is a graph depicting simulation results of a particulate filter regeneration cycle of the prior art.

The following description of the preferred embodiment(s) is merely exemplary in nature and is in no way intended to limit the invention, its application, or uses. For purposes of clarity, the same reference numbers will be used in the drawings to identify similar elements. As used herein, the term module, circuit and/or device refers to an Application Specific Integrated Circuit (ASIC), an electronic circuit, a processor (shared, dedicated, or group) and memory that execute one or more software or firmware programs, a combinational logic circuit, and/or other suitable components that provide the described functionality.

Figure 3:
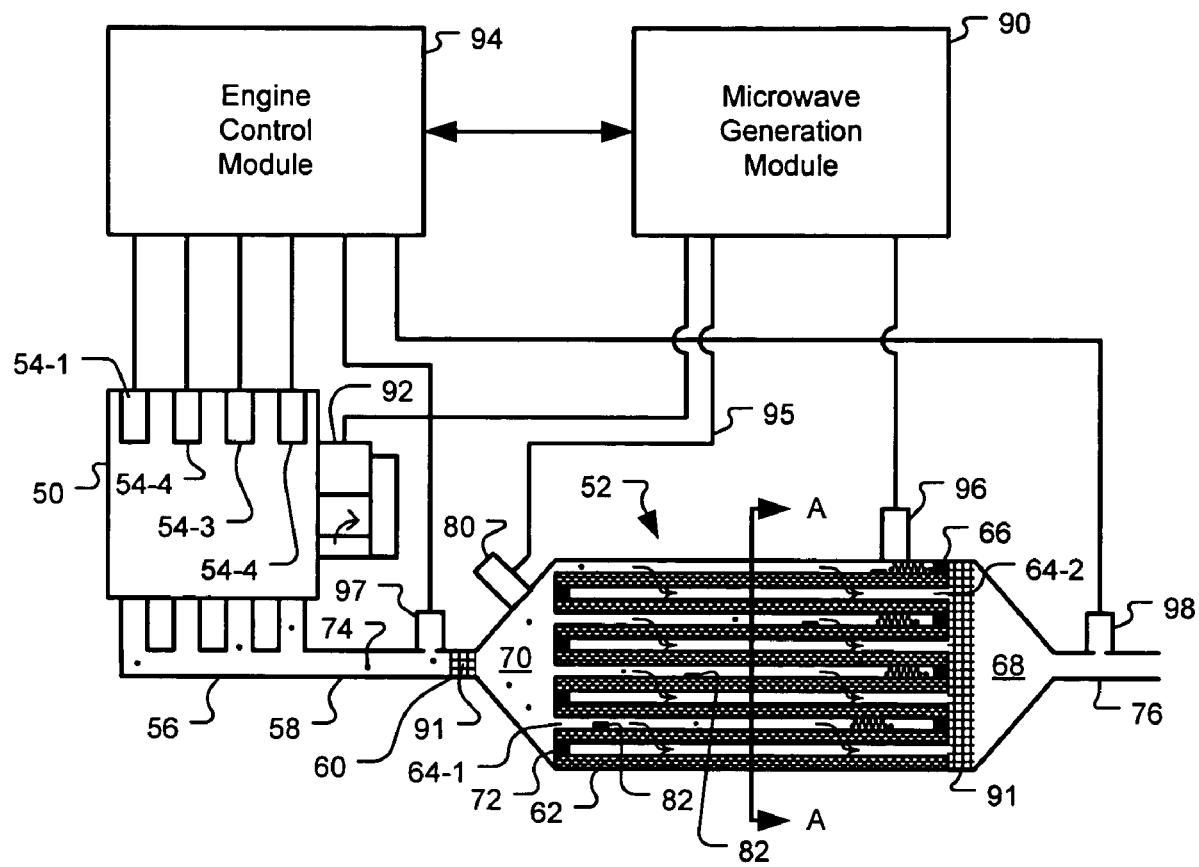
FIG. 3 is a block diagram of an engine system that includes a hydrocarbon (HC) -enhanced particulate filter regeneration system.

Turning now to FIG. 3, a block diagram is shown of an engine 50 connected to a heated particulate filter 52. The depicted engine 50 is a four-cylinder engine 50, however it is appreciated by those skilled in the art that the engine 50 can have any number of cylinders. In some embodiments the engine 50 is a diesel engine. The engine 50 includes fuel injectors 54-1, . . . , 54-4, referred to collectively as the fuel injectors 54, that deliver fuel to respective cylinders. The fuel injectors 54 can deliver fuel directly into the cylinders of the engine 50. An exhaust manifold 56 receives unfiltered exhaust gas from the engine 50 and directs the unfiltered exhaust gas through a collector pipe 58. An outlet of the collector pipe 58 connects to an inlet 60 of the heated particulate filter 52.

The heated particulate filter 52 includes a filter substrate 62 that is formed to include a plurality of inlet channels 64-1 and outlet channels 64-2, referred to collectively as the channels 64. The filter substrate 62 can be formed from a porous material, such as cordierite and/or silicon carbide, which is tolerant of exhaust and particulate filter regeneration temperatures. The inlet channels 64-1 include associated downstream plugs 66 that prevent the unfiltered exhaust gas from reaching an outlet plenum 68. The inlet channels 64-1 have ends that are open to an inlet plenum 70.

The outlet channels 64-2 include associated upstream plugs 72 that prevent the unfiltered exhaust gas and particulate matter 74 from entering the outlet channels 64-2. The outlet channels 64-2 have ends that are open to the outlet plenum 68.

In operation, the unfiltered exhaust gas enters the inlet channels 64-1. The particulate matter 74 is too large to pass through walls of the filter substrate 62 and becomes trapped in the inlet channels 64-1. Filtered exhaust gas exits through the outlet channels 64-2 and passes through the outlet plenum 68 before reaching an outlet 76.

Figure 4:
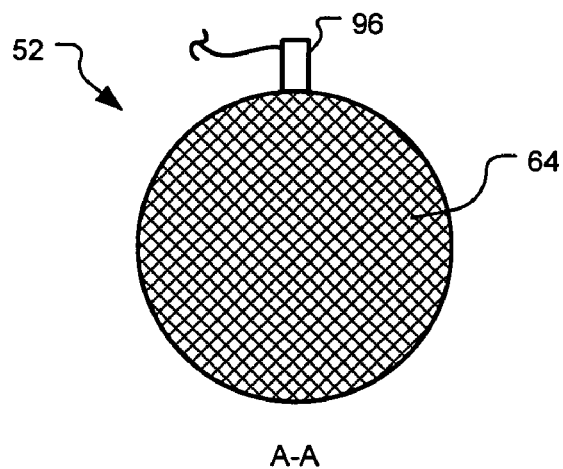
FIG. 4 is a cross-sectional view of a particulate filter.

Turning briefly to FIG. 4, a cross-section view of the heated particulate filter 52 is shown along a section line . A-A of FIG. 1. The cross-section shows an end view of the channels 64. The channels 64 can have a density between 100-300 channels per square inch.

Returning now to FIG. 3, the heated particulate filter 52 includes a heat source for heating at least a portion of the particulate matter 74 until it oxidizes, thereby clearing the particulate matter 74 from the inlet channels 64-1 and regenerating the heated particulate filter 52. The heat source can be inductive, resistive, arc, microwave, or any other heat source now known or developed later.

In the system of FIG.3, the heat source is a microwave heat source. A microwave E-probe antenna 80 selectively radiates microwave energy into the heated particulate filter 52. The inlet channels 64-1 Include microwave absorbent spots 82 that are positioned on the walls of the inlet channels 64-1. The microwave absorbent spots 82 are formed from one or more materials such as silicon carbide (SiC), indium tin oxide (ITO), and/or iron, and reach at least the combustion temperature of the particulate matter 74 when they are radiated with the microwave energy.

Once the particulate matter 74 reaches its combustion temperature and begins to oxidize, the heat source is turned off to conserve energy. The oxidation reaction can thereafter be maintained by hydrocarbons, e.g. gasoline or diesel fuel, which is delivered into the inlet channels 64-1 in accordance with a method described later.

The heated particulate filter 52 includes metallic screens and/or honeycombs 91 that allow exhaust gas to pass through while attenuating microwave energy that escapes from the heated particulate filter 52.

A microwave generation module 90 receives electrical energy from an alternator 92 and/or electrical subsystem that are powered by the engine 50. The microwave generation module 90 converts the electrical energy to microwave energy in accordance with a regeneration command from an engine control module (ECM) 94. A coaxial cable 95 connects the microwave generation module 90 to the E-probe antenna 80. The coaxial cable 95 can be s semi-rigid coaxial cable 95.

A temperature sensor 96 generates a temperature signal based on the temperature of the filter substrate 62. The temperature signal can be communicated to the microwave generation module 90.

In some embodiments the ECM 94 can receive an upstream pressure signal from an upstream pressure transducer 97 that is mounted at the inlet 60. The ECM 94 can also receive a downstream pressure signal from a downstream pressure transducer 98 that is mounted at the outlet 76. The ECM 94 can determine a differential pressure across the inlet 60 and the outlet 76 by determining a difference between the upstream and downstream pressure signals. The differential pressure is indicative of a quantity of particulate matter 74 that is accumulated on the walls of the inlet channels 64-1. In some embodiments the upstream pressure transducer 97 and the downstream pressure transducer 98 can be substituted with a single differential pressure transducer that communicates a differential pressure signal to the ECM 94.

The ECM 94 provides an injector drive signal to respective ones of the fuel injectors 54. The duration of each injector drive signal corresponds to operating conditions of the engine 50 such as intake air flow, throttle pedal position, and engine temperature, and determines the amount of fuel that is delivered to the corresponding cylinder of the engine 50. The amount of fuel delivered to the engine and the operating conditions of the engine are indicative of the amount of particulate matter 74 that the engine 50 will generate. The ECM 94 can therefore integrate the expected particulate matter 74 generation rate over time to determine the amount of particulate matter 74 on the walls of the inlet channels 64-1 at any time. The ECM 94 can use the differential pressure across the heated particulate filter 52 and/or the particulate matter 74 integration method to determine when the heated particulate filter 52 needs to be regenerated and to determine how much particulate matter 74 is accumulated in the inlet channels 64-1.

Figure 5:
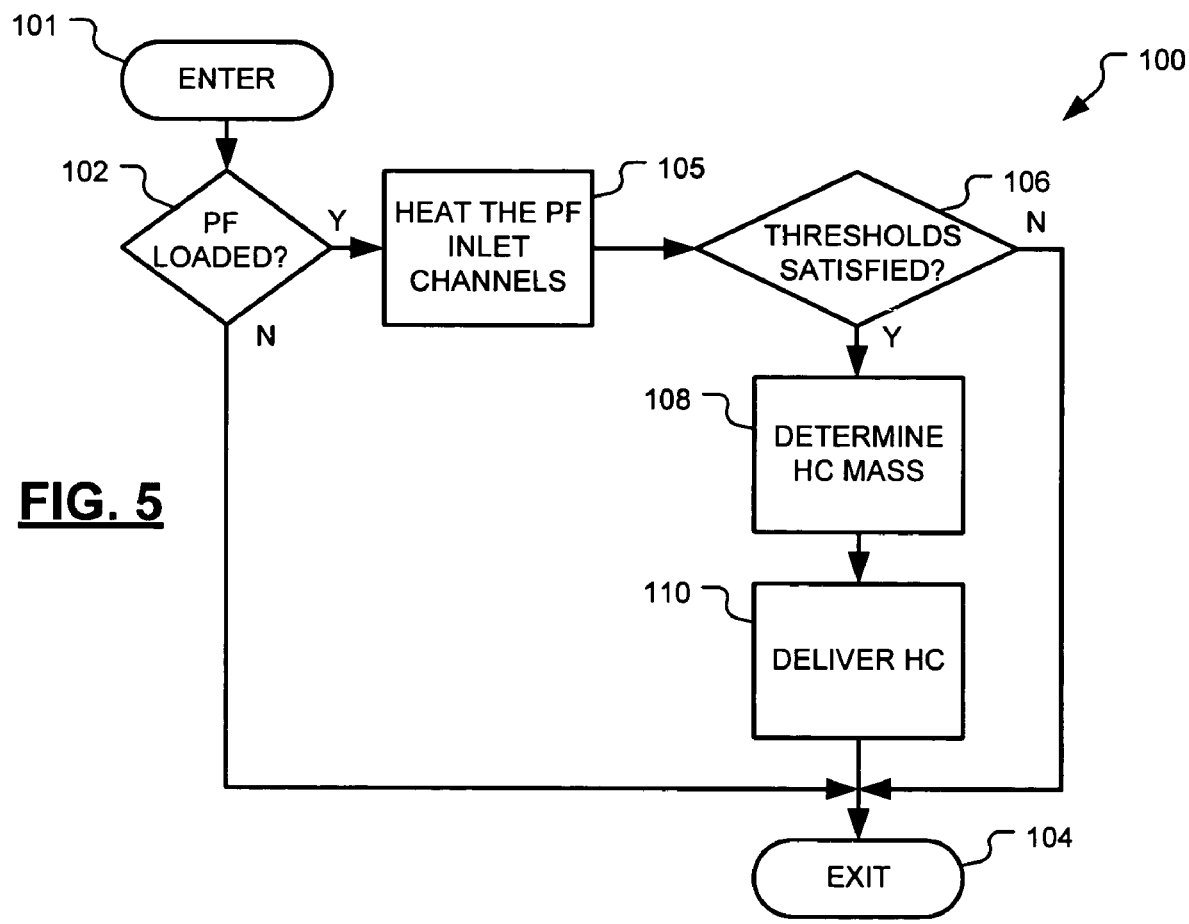
FIG. 5 is a flow chart of a method for using an HC-enhanced particulate filter regeneration system.

Turning now to FIG. 5, a method 100 is shown for regenerating the heated particulate filter (PF) 52. The method 100 can be implemented as a software subroutine and stored as computer instructions in a computer memory located in the ECM 94 and/or the microwave generation module 90. The method 100 can then be executed periodically by a microprocessor that is connected to the memory.

The method 100 begins in start block 101 and control immediately proceeds to decision block 102. In decision block 102, control determines whether the inlet channels 64-1 are loaded with the particulate matter 74. The inlet channels 64-1 are deemed to be loaded when a predetermined quantity of particulate matter 74 is accumulated in the inlet channels 64-1. If the inlet channels 64-1 are not loaded, control proceeds to exit block 104 and terminates. On the other hand, if control determines that the inlet channels 64-1 are loaded then control proceeds to block 105. In block 105 control turns on the heat source, such as the microwave E-probe antenna 80, to begin heating the accumulated particulate matter 74. Control then proceeds to decision block 106. Control can turn the heat source on for an amount of time that is a predetermined time, an amount of time that is a function of the exhaust gas conditions from the engine 50, and/or an amount of time that is a function of the temperature of the filter substrate 62. Examples of exhaust gas conditions include an exhaust gas temperature and/or an exhaust flow rate.

In block 106, control determines whether the exhaust gas conditions are such that they may extinguish or otherwise prevent the accumulated particulate matter 74 from oxidizing. If the exhaust temperature is above a predetermined exhaust temperature, and/or if the exhaust gas flow rate is below a predetermined flow rate, then control proceeds to exit block 104 and terminates. On the other hand, if the exhaust temperature is below the predetermined exhaust temperature, and/or if the exhaust gas flow rate is above the predetermined flow rate, then control proceeds to block 108.

In block 108, control determines an amount of HC to deliver into the inlet channels 64-1. The ECM 94 can deliver the HC by turning on one or more of the fuel injectors 54 during an exhaust stroke of the cylinder associated with the energized fuel injector(s). The amount of HC that the ECM 94 delivers can be based on the exhaust gas conditions, the amount of particulate matter 74 accumulated in the inlet channels 64-1, and or the temperature of the filter substrate 62. The amount of particulate matter 74 accumulated in the inlet channels 64-1 can be determined by the differential pressure method and/or the integration method described above. After determining the amount of HC to deliver in block 108, control proceeds to block 110 and delivers the HC.

In some embodiments, a waiting step can be included between blocks 105 and 110. The waiting step ensures that the heat source has ample time to elevate the temperature of the accumulated particulate matter 74 to its combustion temperature. This ensures that the HC will combust and contribute to oxidizing the accumulated particulate matter 74.

By delivering HC to the inlet channels 64-1 during regeneration, the method 100 reduces the electrical energy needed by the heat source of the heated particulate filter 52. The heat source can be turned off once the HC begins to combust and oxidize the accumulated particulate matter 74. Delivering HC to the inlet channels 64-1 will also accelerate the particulate matter 74 oxidation and prevent the oxidation reaction from being extinguished by the exhaust gas.

The description of the invention is merely exemplary in nature and, thus, variations that do not depart from the gist of the invention are intended to be within the scope of the invention. Such variations are not to be regarded as a departure from the spirit and scope of the invention.

What is claimed is:

1. A regeneration method for a particulate filter, comprising:

estimating a quantity of particulate matter trapped within the particulate filter;

comparing the quantity of particulate matter to a predetermined quantity;

heating at least a portion of the particulate filter to a combustion temperature of the particulate matter;

estimating a quantity of hydrocarbon fuel based on the quantity of particulate matter; and introducing the quantity of hydrocarbon fuel to the particulate filter, wherein the hydrocarbon fuel facilitates combustion of the particulate matter to regenerate the particulate filter.

2. The regeneration method of claim 1 wherein the step of estimating the quantity of particulate matter includes estimating a quantity of particulate matter that is generated by an internal combustion engine in communication with the particulate filter.

3. The regeneration method of claim 1 further comprising estimating an exhaust gas pressure in the particulate filter and estimating the quantity of particulate matter based on the exhaust gas pressure.

4. The regeneration method of claim 3 wherein the exhaust gas pressure includes a differential exhaust gas pressure.

5. The regeneration method of claim 1 wherein the heating step includes at least one of microwave heating, resistive heating, inductive heating, and arc heating.

6. The regeneration method of claim 1 further comprising estimating a temperature of the particulate filter and terminating the heating step based on the temperature.

7. The regeneration method of claim 1 further comprising estimating at least one of an exhaust gas temperature and an exhaust gas flow rate and executing the step of introducing hydrocarbon fuel based on at least one of the exhaust gas temperature and the exhaust gas flow rate.

8. The regeneration method of claim 7 further comprising terminating the heating step based on at least one of the exhaust gas temperature and the exhaust gas flow rate.

9. A particulate filter regeneration system, comprising:
 a control module;
 a sensor that is in communication with the control module and generates a signal indicative of a quantity of particulate matter within the particulate filter;
 said control module estimates a quantity of hydrocarbon fuel based on the quantity of particulate matter;
 a heat source that is controlled by the control module and heats at least a portion of the particulate filter to a combustion temperature of the particulate matter; and
 a fuel injector that is controlled by the control module and delivers the quantity of hydrocarbon fuel to the particulate filter, wherein the control module estimates the quantity of particulate matter based on the sensor signal, compares the quantity of particulate matter to a predetermined quantity, and delivers hydrocarbon fuel via the fuel injector to facilitate combustion of the particulate matter and regeneration of the particulate filter.

10. The particulate filter regeneration system of claim 9 wherein the control module estimates the quantity of particulate matter based on a quantity of particulate matter that is generated by an internal combustion engine in communication with the particulate filter.

11. The particulate filter regeneration system of claim 9 further comprising an exhaust pressure sensor that communicates with the control module and generates an exhaust pressure signal based on an exhaust gas pressure in the particulate filter and wherein the control module estimates the quantity of particulate matter based on the exhaust pressure signal.

12. The particulate filter regeneration system of claim 3 wherein the exhaust pressure sensor signal indicates a differential exhaust gas pressure.

13. The particulate filter regeneration system of claim 9 wherein the heat source includes at least one of a microwave generator, a resistive heating element, an inductive heating element, and a spark gap.

14. The particulate filter regeneration system of claim 9 further comprising a temperature sensor that generates a temperature signal based on a temperature inside of the particulate filter and communicates the temperature signal to the control module and wherein the control module controls the heat source based on the temperature signal.

15. The particulate filter regeneration system of claim 9 wherein the control module estimates at least one of an exhaust gas temperature and an exhaust gas flow rate through the particulate filter and operates the fuel injector based on at least one of the exhaust gas temperature and the exhaust gas flow rate.

16. The particulate filter regeneration system claim 15 wherein the control module operates the heat source based on at least one of the exhaust gas temperature and the exhaust gas flow rate.

17. A regenerative particulate filter system, comprising:
 a control module;
 an engine including an exhaust manifold and at least one fuel injector that is controlled by the control module;
 a particulate filter including first channels in communication with the exhaust manifold, second channels in communication with an exhaust gas outlet of the particulate filter, and a filter substrate positioned between the first and second inlet channels and collecting at least a portion of particulate matter particulate matter carried by exhaust gas from the engine;
 microwave absorbent spots positioned on the filter substrate; and
 a microwave source that is controlled by the control system and heats the microwave absorbent spots to at least a combustion temperature of the particulate matter, wherein the control module estimates a quantity of particulate matter collected on the filter substrate based on an amount of fuel delivered by the at least one injector and consumed by the engine,
 wherein the control module compares the estimated quantity of particulate matter to a predetermined quantity,
 wherein the control module turns on the microwave source based on the comparison, and
 wherein the control module estimates a predetermined quantity of hydrocarbon based on the estimated quantity of particulate matter and controls the at least one fuel injector to dispense the predetermined quantity of hydrocarbon fuel.

18. The regenerative particulate filter system of claim 17 further comprising an exhaust gas pressure sensor in communication with the control module and generating a signal indicative of an exhaust gas pressure across the filter substrate, wherein the control module further estimates the quantity of particulate matter based on the signal.

* * * * *

UNITED STATES PATENT AND TRADEMARK OFFICE
CERTIFICATE OF CORRECTION

PATENT NO. : 7,655,065 B2 Page 1 of 1
APPLICATION NO. : 11/497808
DATED : February 2, 2010
INVENTOR(S) : Gonze et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 772 days.

Signed and Sealed this

Twenty-third Day of November, 2010

David J. Kappos
*Director of the United States Patent and Trademark Office*